(12) United States Patent
Gasser et al.

(10) Patent No.: US 8,037,243 B1
(45) Date of Patent: Oct. 11, 2011

(54) INSTALLING DATA STORAGE SYSTEM SOFTWARE ON DISK DRIVE SYSTEMS

(75) Inventors: Morrie Gasser, Hopkinton, MA (US); Matthew Ferson, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 554 days.

(21) Appl. No.: 11/725,346

(22) Filed: Mar. 19, 2007

(51) Int. Cl.
*G06F 12/00* (2006.01)
(52) U.S. Cl. .................. 711/114; 711/111; 711/112
(58) Field of Classification Search .......... 711/112, 711/111, 114
See application file for complete search history.

(56) References Cited

U.S. PATENT DOCUMENTS

| | | | | |
|---|---|---|---|---|
| 5,694,600 A | * | 12/1997 | Khenson et al. | 713/2 |
| 5,758,054 A | * | 5/1998 | Katz et al. | 714/22 |
| 5,864,698 A | * | 1/1999 | Krau et al. | 713/2 |
| 6,272,628 B1 | * | 8/2001 | Aguilar et al. | 713/2 |
| 6,289,449 B1 | * | 9/2001 | Aguilar et al. | 713/2 |
| 6,415,387 B1 | * | 7/2002 | Aguilar et al. | 713/320 |
| 6,450,832 B1 | * | 9/2002 | Aguilar et al. | 439/490 |
| 6,470,457 B1 | * | 10/2002 | Brewer et al. | 713/324 |
| 6,836,859 B2 | * | 12/2004 | Berg et al. | 714/36 |
| 7,000,142 B2 | * | 2/2006 | McCombs | 714/6 |
| 2003/0037282 A1 | * | 2/2003 | Berg et al. | 714/11 |
| 2005/0193232 A1 | * | 9/2005 | Diehl | 714/5 |

* cited by examiner

*Primary Examiner* — Mardochee Chery
(74) *Attorney, Agent, or Firm* — Krishnendu Gupta; Jason A. Reyes; Deepika Bhayana (57) ABSTRACT

Data storage system software is installed from nonvolatile memory. A storage processor is booted, transferring information stored in a nonvolatile memory module to a disk drive system, thereby enabling the system processor to boot directly from the disk drive system in subsequent boots. After the information is transferred the storage processor reboots using the information transferred to the disk drive system.

17 Claims, 6 Drawing Sheets

FLASH MEMORY MODULE PARTITION LAYOUT

INSTALLING DATA STORAGE SYSTEM SOFTWARE ON DISK DRIVE SYSTEMS

BACKGROUND OF THE INVENTION

1. Field of the Invention

The present invention relates to installing data storage system software on disk drive systems.

2. Brief Description of Related Prior Art

As is known in the art, large mainframe computer systems and data servers sometimes require large capacity data storage systems. One type of data storage system is a magnetic disk storage system. Here a bank of disk drives and the computer systems and data servers are coupled together through an interface. The interface includes storage processors that operate in such a way that they are transparent to the computer. That is, data is stored in, and retrieved from, the bank of disk drives in such a way that the mainframe computer system or data server functions as if it is operating with one mainframe memory. One type of data storage system is a Redundant Array of Inexpensive Disks (RAID) data storage system. A RAID data storage system includes two or more disk drives in combination for fault tolerance and performance. A RAID data storage system is typically made up of a front-end data processor (DPE) and mated with back-end storage disk array enclosure (DAE). Typically the DPE boots up using information which is pre-installed on disks of either the DPE or the DAE. The pre-installed information conventionally needs to be customized to the exact type, configuration and nature of the DPE and the exact type, configuration and nature of the disk drives chosen to form the RAID data storage system. Consequently the disk drives which are pre-installed with information for a specific DPE and disk drive configuration are different from similar disk drives which are pre-installed with information for a different DPE and disk drive configuration, due to the information difference install on the drives.

SUMMARY OF THE INVENTION

Data storage system software is installed from nonvolatile memory. A storage processor is booted, transferring information stored in a nonvolatile memory module to a disk drive system, thereby enabling the system processor to boot directly from the disk drive system in subsequent boots. After the information is transferred the storage processor reboots using the information transferred to the disk drive system.

One or more implementations of the invention may provide one or more of the following advantages.

Manufacturers and integrator of data storage system are enabled to ship a data storage systems to customers configured using a common set DPE combined with common set of empty disk drives. The use of empty disk drive simplifies inventory management and increase flexibility in the manufacturing process.

Other advantages and features will become apparent from the following description, including the drawings, and from the claims.

The details of one or more embodiments of the invention are set forth in the accompanying drawings and the description below. Other features, objects, and advantages of the invention are apparent from the description and drawings, and from the claims.

DETAILED DESCRIPTION

Conventionally manufacturers and integrators including original equipment manufacturers (OEM), value added resellers (VAR), and distributors that resell storage products need to assemble arrays to match the configuration of each customer order. This typically requires selecting the desired type of DPE and installing the desired numbers and types of drives requested by the customer. To simplify site installation the boot drives each array are preinstalled with the array's operating system software. The preinstalled software is matched to the type of DPE used in any particular RAID data storage system. RAID data storage system vendors often support many types of drives in the array (SAS, Serial ATA), different capacities), this means the manufacturer and integrator must stock a different array part number for each different drive type and DPE type combination. When adding other preinstalled options on the DPE such as a Fibre or Internet SCSI (iSCSI) front-end, the number of different part numbers multiplies, increasing inventory costs and storage space.

The manufacturer and integrator also need to anticipate the quantity of different types of arrays to stock and many numbers of different types of drives with particular preinstalled software to stock.

Eliminating the requirement for pre-installation of software on disk drives substantially overcomes such shortcomings of conventional approaches.

Figure 1:
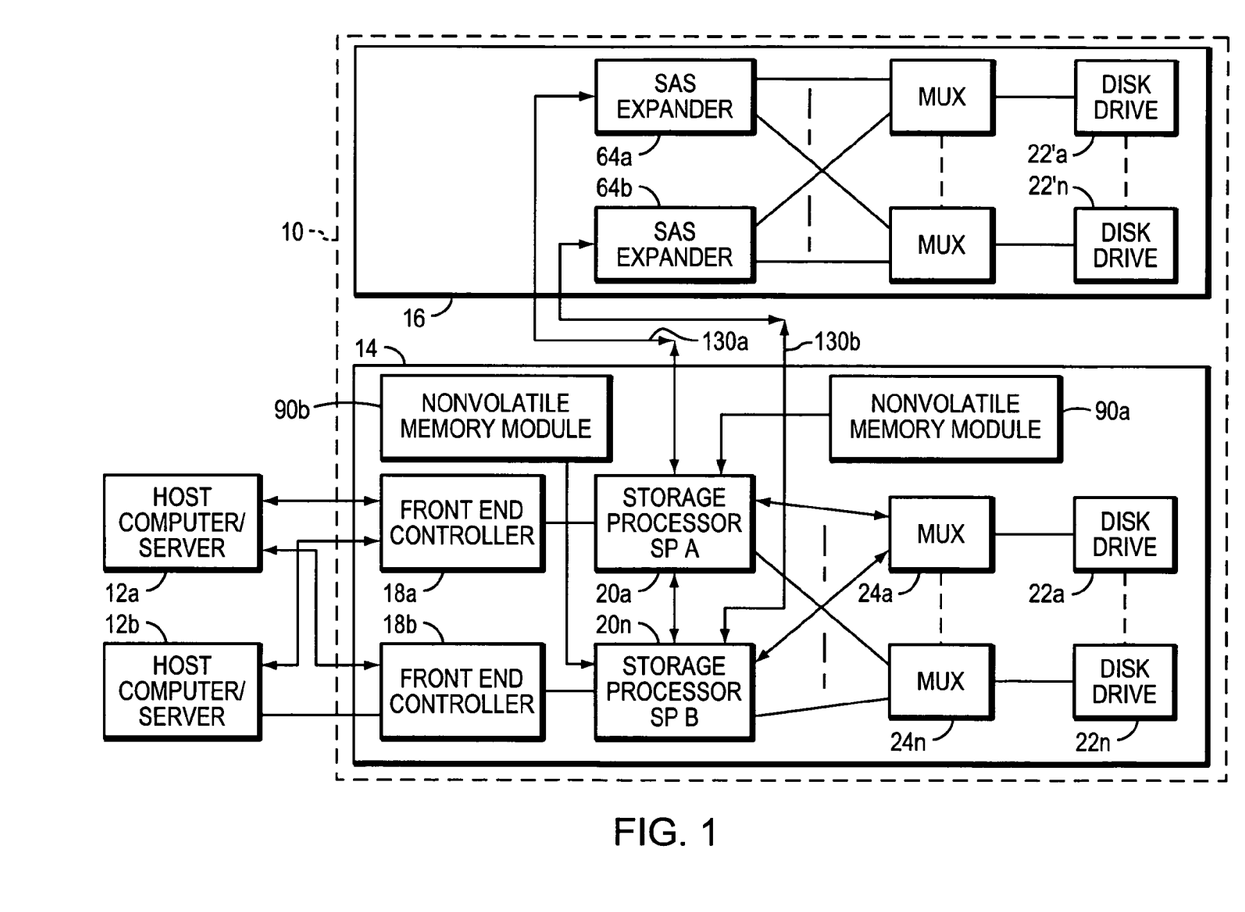
FIGS. 1-3 are block diagrams of a RAID data storage system with serial SCSI (SAS) expansion.

Referring now to FIG. 1, a data storage system 10 is shown coupled to a pair of host computer/servers 12a, 12b, as shown. The data storage system 10 includes a plurality of, here for example, two chassis or enclosures 14, 16, as shown. Enclosure 14 is sometimes referred to herein as a DPE and enclosure 16 is sometimes referred to herein as a DAE. The DPE 14 and DAE 16 are described in more detail in connection with FIGS. 2 and 3, respectively. Suffice it to say here that DPE 14 includes a pair of front end controllers 18a, 18b, each having a pair of ports coupled to the pair of host computer/servers 12a, 12b, as shown. The DPE 14 also includes a pair of storage processors 20a, 20b coupled to each other with storage processor 20a being connected to front end controller 18a and storage processor 20b being connected to front end controller 18b, as shown. The storage processors 20a and 20b are connected to a bank of disk drives 22a-22n though a plurality of multiplexers 24a-24n, as shown.

The storage processors 20a, 20b of DPE 14 are connected to the DAE 16 though a pair of cables 130a, 130b, respectively, as shown. As is described in more detail in connection with FIG. 3, the DAE 16 includes additional disk drives 22'a-22'n, here for example, twelve disk drives, and is used to increase the storage capacity of the data storage system 10. Thus, in this example, the number of disk drives 22a-22n in DPE 14 is twelve and the user has chosen to expand the storage capacity to twenty four disk drives by connecting the DAE 16 which in this example includes twelve disk drives 22'a-22'n.

The storage processors 20a, 20b of DPE 14 are connected to nonvolatile memory modules 90a, 90b.

Figure 2:
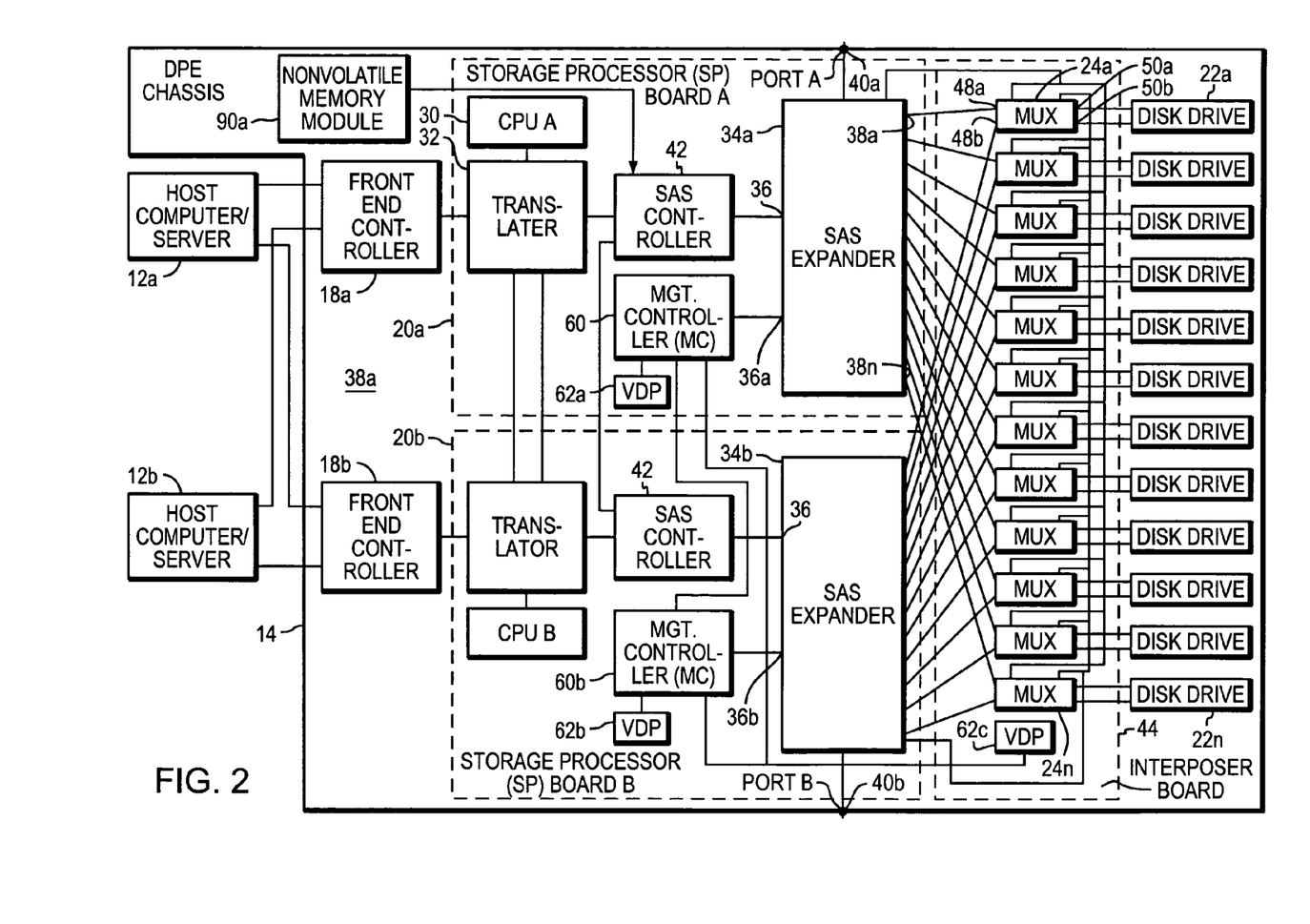

Referring now to FIG. 2, the DPE 14 is shown to include the pair of storage processors 20a, 20b, each disposed on a corresponding one of a pair of printed circuit boards STORAGE PROCESSOR BOARD A and STORAGE PROCESSOR BOARD B [fix since SP was already defined], respectively, as indicated. Each one of the printed circuit boards has disposed thereon: (a) a processor 30; (b) a translator 32 controlled by the processor 30; (c) a SAS expander 34a on STORAGE PROCESSOR BOARD A and SAS expander 34b on STORAGE PROCESSOR BOARD B each having a bidirectional front end port 36 and a plurality of bidirectional backend ports 38a-38n, and an expansion port 40a for STORAGE PROCESSOR BOARD A and 40b STORAGE PROCESSOR BOARD B; and (d) a SAS controller 42 coupled between the translator 32 and the expander controller 34; as shown. The DPE 14 also includes an interposer printed circuit board 44 having thereon the plurality of, here twelve, multiplexers 24a-24n. While the preferred implementation uses an interposer printed circuit board to connect the STORAGE PROCESSOR BOARD to the disk drives, other implementations are possible.

Each one of the multiplexers 24a-24n has: (a) a pair of bidirectional front end ports 48a, 48b; and (b) a pair of bidirectional back end ports 50a, 50b. For each one of the plurality of multiplexers 24a-24n, a first one of the pair of bidirectional front end ports for example port 48a is connected to a corresponding backend port 38a of the SAS expander 34a disposed on a first one of the pair of storage processor printed circuit boards, here STORAGE PROCESSOR BOARD A; and a second one of the pair of bidirectional front end ports 48b is connected to a corresponding backend port 38n of the SAS expander 34b disposed on a second one of the pair of storage processor printed circuit boards here STORAGE PROCESSOR BOARD B.

As noted above, the DPE 14 includes a plurality of disk drives 22a-22n. Each one of the disk drives is coupled to at least one backend port 50a, 50b of a corresponding one of the plurality of multiplexers 22a-22n. More particularly, in the disk drive 22a-22n is a SAS disk drive having a pair of ports, as shown in FIG. 2, the pair of ports is connected to the pair of backend ports of the multiplexer; on the other hand, if the disk drive is a Serial ATA (SATA) disk drive having a single port the signal port is connected to only one of the pair of backend ports of the multiplexer. The multiplexers are here active multiplexers described in the above referenced pending patent application the subject matter thereof being incorporated herein by reference.

The DPE 14 also includes a pair of management controllers 60, each one being disposed on a corresponding one of the pair of storage processor printed circuit boards here STORAGE PROCESSOR BOARD A and here STORAGE PROCESSOR BOARD B, as shown. A first of the pair of management controllers 60, here the controller 60 disposed on STORAGE PROCESSOR BOARD A includes an additional front end port 36a of the SAS expander 34 disposed on such storage processor printed circuit boards and the second one of the pair of management controllers 60 disposed on the STORAGE PROCESSOR BOARD B is coupled to an additional front end port 36b of the SAS expander 34, as shown.

Monitors 62a, 62b, 62c herein sometimes referred to as a Vital Product Data (VPD), are disposed on the STORAGE PROCESSOR BOARD A, STORAGE PROCESSOR BOARD B and interposer board 44, respectively, as shown. The monitors 62a, 62b, and 62c are coupled to the pair of management controllers 60 on the STORAGE PROCESSOR BOARDS A and B, as shown. Vital Product Data includes information programmed by the factory into a "resume" EEPROM on some Field Replaceable Units (FRUs), generally containing some unique information on each part such as a World Wide Number and serial number. The term "VPD" is often used to refer to the EEPROM itself. Here, there is a VPD EEPROM on each STORAGE PROCESSOR BOARD A, STORAGE PROCESSOR BOARD B and interposer board 44.

Figure 3:
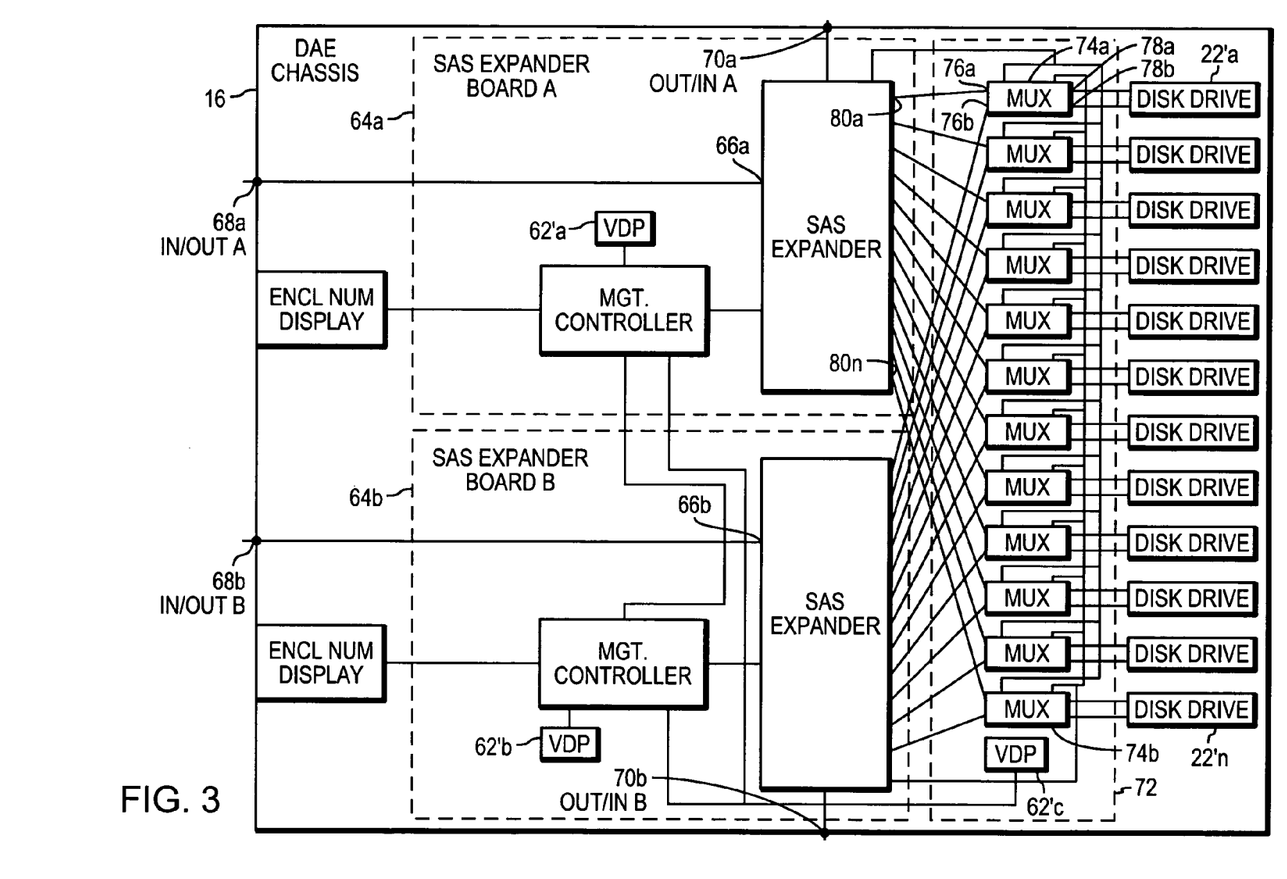

Referring now to FIG. 3, DAE 16 is shown to include a pair of SAS expander printed circuit boards 64a, 64b, a pair of SAS expanders 66a, 66b, each one being disposed on a corresponding one of the pair of SAS expander printed circuit boards 64a, 64b, each one of the pair of SAS expanders 66a, 66b has a bidirectional front end expansion port 68a, 68b, respectively, and a bidirectional backend expansion port 70a, 70b, respectively.

Also included in DAE 16 is an interposer printed circuit 72 board. A plurality of, here twelve, multiplexers 74a-74n is disposed on the interposer printed circuit board 72, each one of the plurality of multiplexers 74a-74n includes (a) a pair of bidirectional front end ports 76a, 76b; (b) a pair of bidirectional back end ports 78a, 78b. For each one of the multiplexers 74a-74n, a first one of the pair of bidirectional front end ports here port 76a, for example, is connected to a corresponding one of backend ports 80a-80n of the SAS expander 66a and a second one of the pair of bidirectional front end ports, here 76b, for example, is connected to a corresponding backend port of the SAS expander 66b as shown. The DAE 16 includes, as noted above, the plurality of disk drives 22'a-22'n, each one being coupled to at least one backend port 78a, 78b of a corresponding one of the plurality of multiplexers 74a-74n. More particularly, in the disk drive 22'a-22'n is a SAS disk drive having a pair of ports, as shown in FIG. 3, the pair of ports is connected to the pair of backend ports of the multiplexer; on the other hand, if the disk drive is a SATA disk drive having a single port the signal port is connected to only one of the pair of backend ports of the multiplexer. The multiplexers are here active multiplexers described in the above referenced pending patent application the subject matter thereof being incorporated herein by reference.

Referring again also to FIGS. 1 and 2, the expansion ports 40a, 40b of SAS expanders 34a, 34b are connected to the bidirectional front end expansion ports 68a, 68b, respectively, as shown. Thus, SAS expander 34a is connected to SAS expander 64a through cable 130a and SAS expander 34b is connected to SAS expander 64b through cable 130b. Thus, referring to FIG. 1, data can pass between any one of the host computer/servers 12a, 12b and any one of the here twenty four disk drives 22a-22n and 22'a-22'n.

Referring again to FIG., 3, as with DPE 14 (FIG. 2) the DAE 16 includes a pair of management controllers, each one being disposed on a corresponding one of the pair of expander printed circuit boards, a first of the pair of expansion board management controllers being coupled to an additional front end port of the SAS expander disposed on the first one of the pair of expander printed circuit boards and a second one the pair of expansion management controllers being coupled to an additional front end port of the SAS expander disposed on the second one of the pair of expander printed circuit boards.

Further, as with the DPE 14, the DAE 16 includes monitors 62'a, 62'b, 62'c having Vital Product Data (VPD) as well as enclosure numerical displays.

Figure 4:
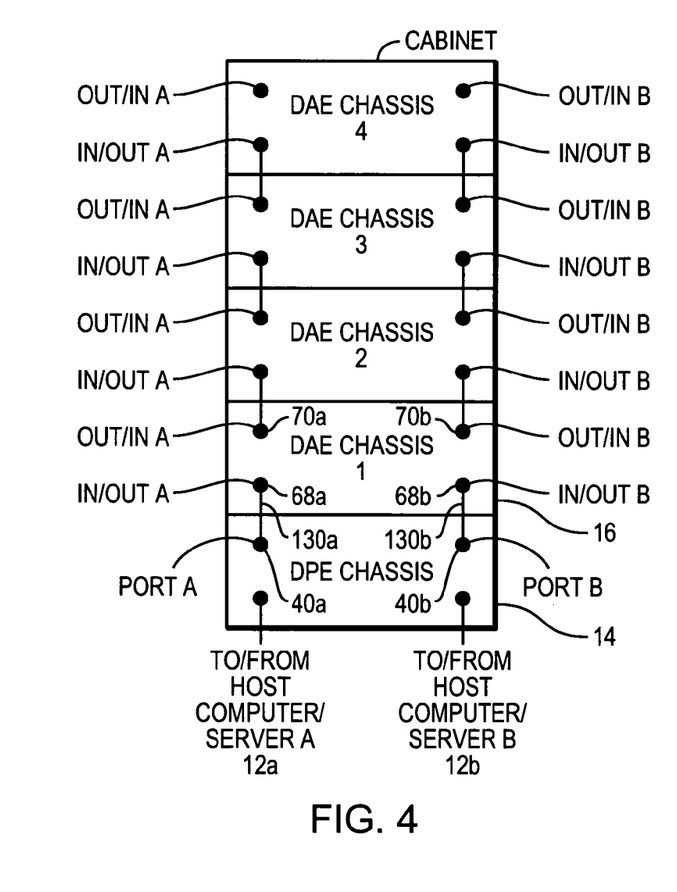
FIGS. 4-4A are block diagrams of interconnections of enclosures in a RAID data storage system with SAS expansion.
Figure 4A:
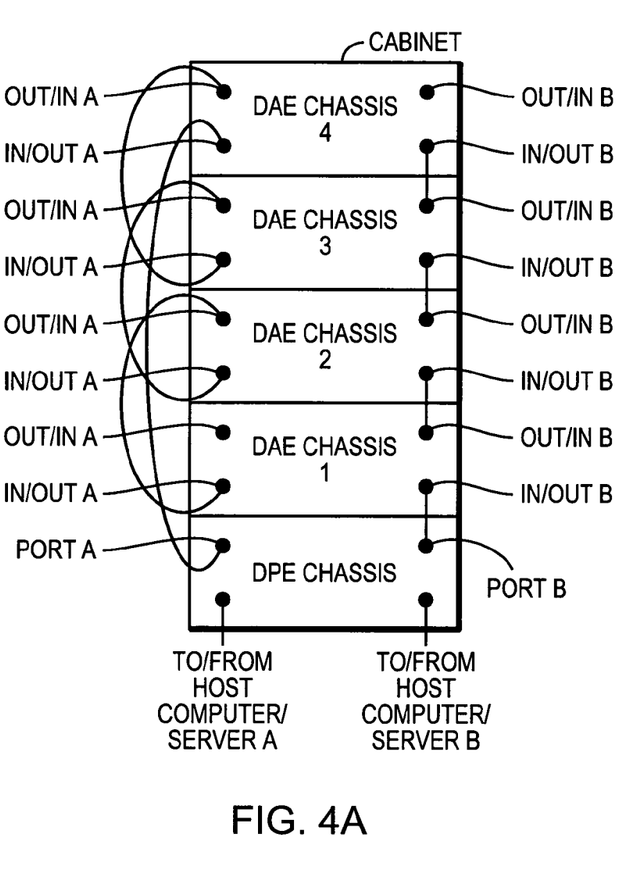

Thus, the data storage system 10 (FIG. 1) may be further expanded as shown in FIG. 4 in a cabinet here having four DAEs 16 and a DPE 12. As noted above, here a DPE has up to 12 disk drives, and each one of the four DAEs, has 12 disk drives to provide, in this example, a data storage system having up to 60 disk drives. Enclosures can be wired up in various ways, two of which are shown in FIG. 4 and another being shown in FIG. 4A. The connections between enclosures consist of standard SAS signals and cables.

Each one of the cables includes four SAS lanes so that at any one instant in time, at most 4 messages can be going to 4 different drives, but successive messages can be sent to different drives using the same SAS lane. Those 4 lanes are also used to send traffic to drives on downstream expanders, so a message can be sent on one of the input lanes, out one of the 4 output lanes to an input lane on the next box.

Here, in the DPE there are eight lanes between the translator and the SAS controller; four SAS lanes between the pair of SAS controllers; one SAS lane between each multiplexer and a backend SAS port; and four lanes at each of the expansion ports 40a, 40b. For each DAE there are four SAS lanes between each one of the ports 70a, 70b and the connected one of the pair of SAS expanders 64a, 64b, respectively, and one SAS lane between each multiplexer and a backend SAS port.

The conventional manufacturing process preloads a boot image directly on the disks, 20a-20n, as part of the manufacturing process using an Image Copy Application (ICA) process. The ICA provides a mechanism to load "virgin" copies of operating system (OS) images to the appropriate regions on the array's drives with a minimum of support hardware required.

ICA images specific to the DPE and selected disk drive combination are downloaded to the drives which are be configured into the DPE. ICA images are compressed to save space and download time. This process creates disk drives which are now customized parts mated to a particular DPE technology. This avoids the need for distributors to stock a multitude of preconfigured RAID data storage system combinations representing all the unique DPE and disk drive type configurations. It is preferable to allow for separate DPE, and non customized disks shipments. This allows the RAID data storage system to initialize its first four boot drives without using conventional LAN-Based ICA manufacturing tools. One SP in each DPE includes a bootable flash memory module containing an initializer program as well as compressed ICA images to be written to the OS disks. The initialization of the disk drives to include bootable information occurs upon the first boot up typically at the customer's site. This eliminates the preloading of the disk as part of the manufacturing process.

A customer can purchase a DPE chassis and standard drives of various interfaces such as the 3.0 Gbit/s SATA (SATA2) or SAS and of different storage capacities. Upon initial installation the customer must populate the DPE with disks, assuring that a minimum of first four drives are inserted properly in the appropriate slots and are of the same type (SAS or SATA2) and of the same storage capacity. Initially, Extended Power On Self Test (POST) executing on the DPE checks the drives for a bootable image. If there is no bootable image, Extended POST boots the SP from the nonvolatile memory module. In at least one implementation a flash memory module is used as the nonvolatile memory module.

Figure 5:
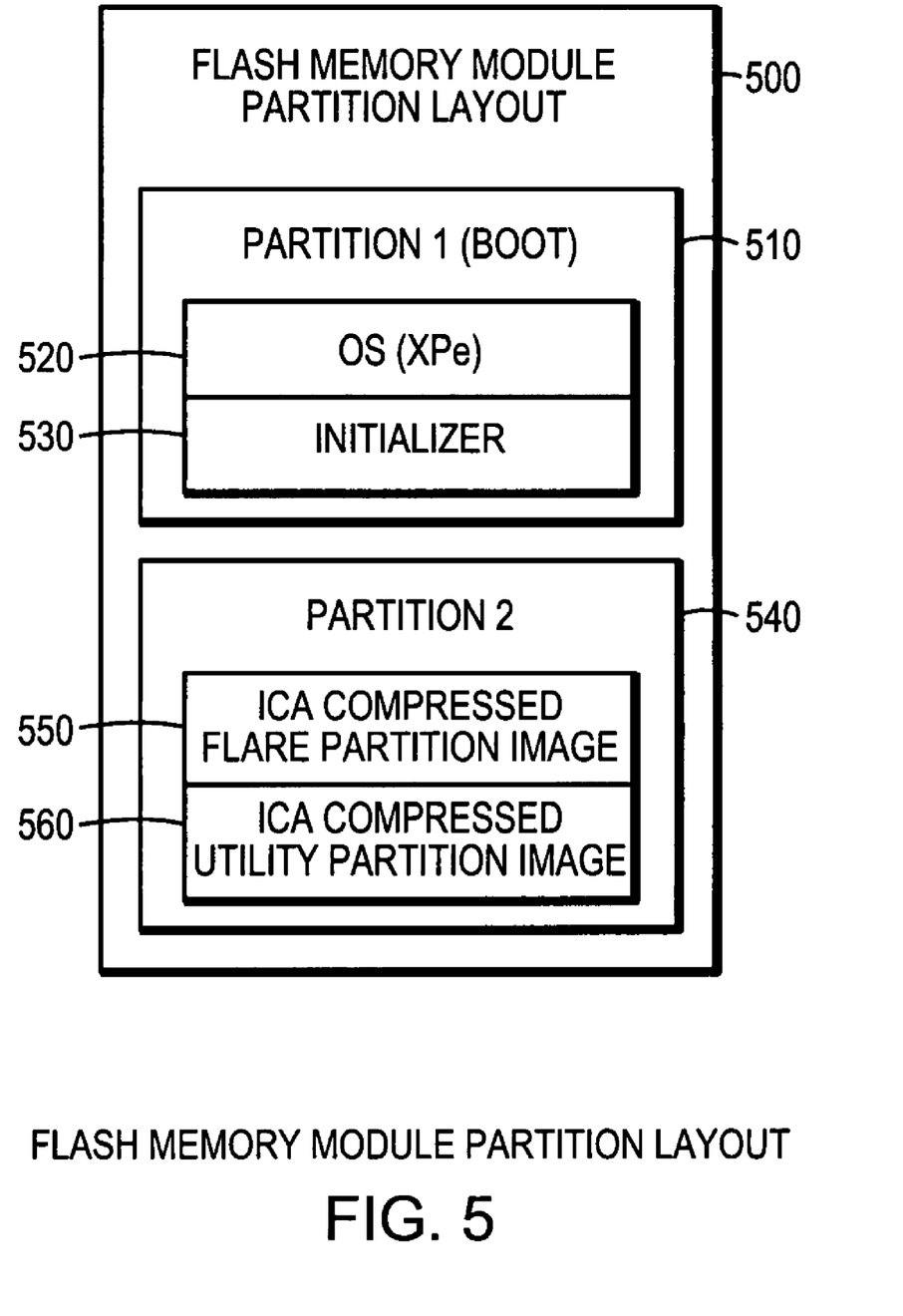
FIG. 5 is a block diagram of a partition structure of the disks on the data storage system.

The preferred implementation uses M-Systems' uDiskOn-Chip™ (uDOC™) as the flash memory module. The uDOC™ is a flash memory storage device that uses a Universal Serial Bus (USB) interface. Referring to FIG. 5, the information 500 on flash memory module 90 includes partition 1 510, and partition 2 540. In an embedded system the DiskOnChip acts as a boot device, filling the same role as an IDE hard drive. Microsoft XP Embedded (XPe) 520 does not have native support to boot from USB device, but M-Systems uDiskOnChip is delivered with XP Embedded components that enable it to boot. These components are included in the XPe OS data 520. The preferred environment uses Microsoft XP Embedded (XPe); however, other implementations are possible. The uDOC part was chosen because it provides the industry's fastest OS boot and application load time. It applies error detection and on-the-fly error correction, as well as automatic bad block handling to map out bad blocks and ensure that no data is lost.

An uDOCPart utility provided by M-Systems is used to partition and format the uDiskOnChip. uDiskOnChip 500, can be divided into up to four partitions, where the first one can be designated as a bootable drive 510. A proposed partition table is shown in FIG. 5. The first bootable partition 510 is formatted with NTFS. It holds Windows XP embedded OS 520, with the initializer program 530 in its Startup directory. The bootable XP software 520 contains minimal XP components to save space in flash memory module and to speedup the booting process. Second partition 540 is also formatted with a Microsoft Windows NT® file system and holds two images: Flare (data storage system operating system) Partition 550 and Utility Partition 560. The Flare Partition is configured to be the bootable partition. Both the FLARE Partition 550 and Utility Partition 560 image are stored in a compressed ICA format.

Figure 6:
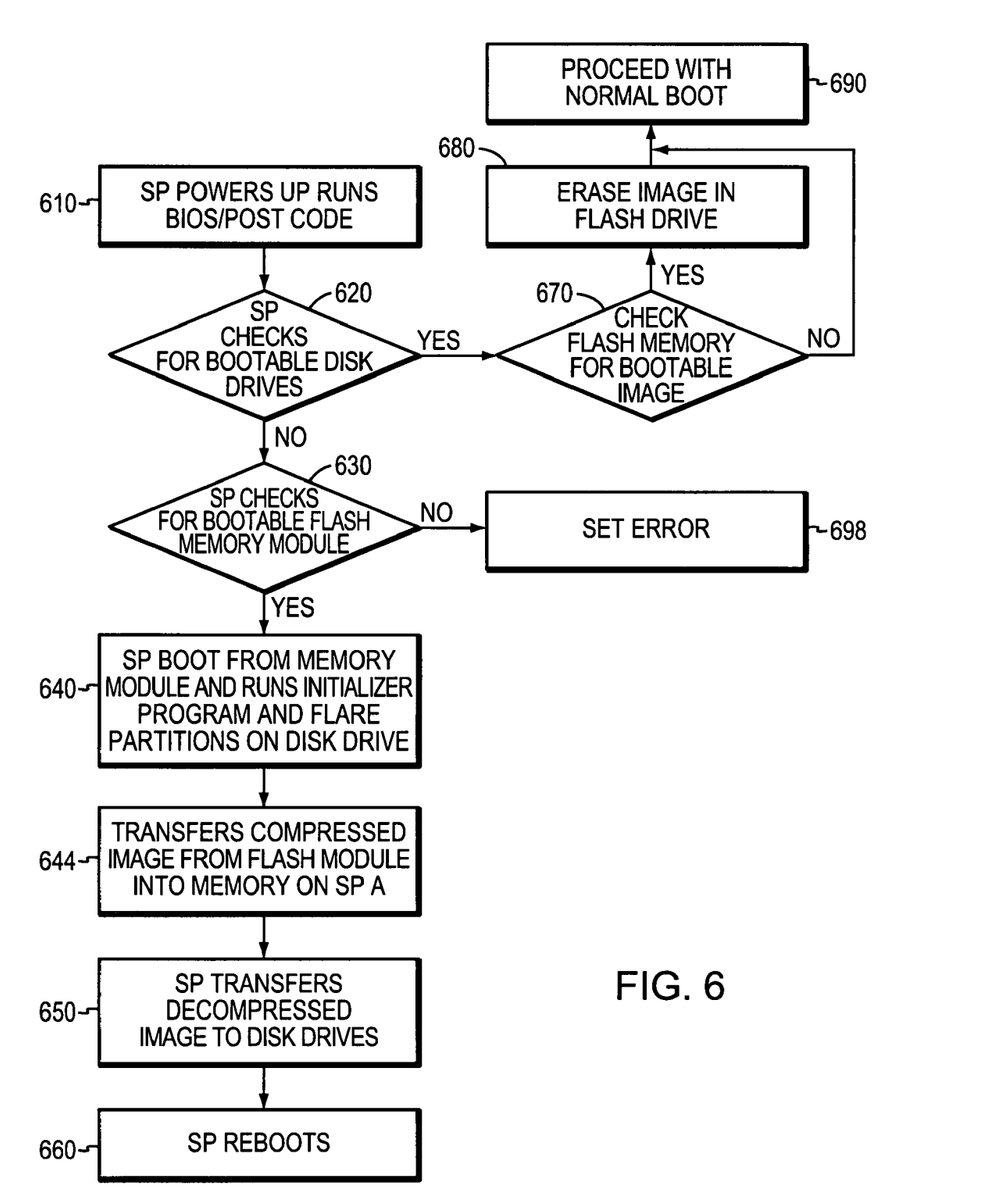
FIG. 6 is a flow chart of a storage processor (SP) booting process.

FIG. 6 is a flow chart that describes the DPE power up sequence. This sequence allows for the unattended transfer information to and configuring of disks 22a-22d as bootable devices. In step 610 the SP A 20a powers up and runs Basic Input/Output System (BIOS) and POST. In step 620 SP A looks for the Flare signature on the appropriate drives 22a-22n depending on the SP, and boots from the selected drive.

If SP A cannot find a Flare signature on the appropriate disk drives 22a-22n, the BIOS/POST code in SP A looks for a bootable image on flash memory module, step 630. If a bootable image is found on the flash memory module, the SP proceeds to step 640 and booting flash memory module running an initializer program contained in the boot image. The initializer module runs required diagnostic checks on the system configuration and hardware 632. Part of this diagnostic validates that the system has the required number of disks, and disk types sizes installed. In case of errors the imaging process will terminate with the error 698.

If no bootable image is found on either the disk drives or the flash memory module, the SP BIOS/POST proceeds to step 698 which sets an error status. In step 640, the initializer program creates signatures and Flare Partitions on disks 22a-22d, wiping out any data already on the disks. The initializer program transfers encrypted/compressed partition images 550 and 560 from flash module into memory on SP A in step 644. In step 650 initializer program then decrypts/decompresses the image in memory and writes it to the appropriate places on disks 22a-22d. The SP copies the decompressed image from the Flare partition image 550 and the decompressed utility partition image 560 from system memory to the disks 20a-20d, creating two partitions respectively on each drive.

The initializer reboots both SP A 20a and SP B 20b, in step 650. BIOS/POST runs on both SP A and SP B and proceeds to booting Flare code which was moved to the appropriate drives in steps 640, 644, 650. In step 670 Flare continues with its normal initialization and checks to see whether there is a boot image on the flash memory module. If there is a boot image on the flash memory module the software proceeds to step 680 where the Flare code erases the boot image from the flash memory module. Erasing the image has many benefits, among which, but not limited to, are the ability to use this flash memory module for other data uses, and preventing the improper use of licensed software. If there is no image in the flash memory module, the boot process proceeds to step 690 where the normal boot sequence continues.

Upon the first boot of Flare Partition after the image copy is completed an image deletion process runs and erases the content of the flash memory module, however before erasing the content of the flash memory module, checks are made 680 to ensure that SP A and SP B are up and running and stable enough to carry on regular storage activity. The process may be run in reverse. Utilities which were moved from the decompressed flash memory module to the data storage system also provide the ability to move the Flare and Utility partitions from the bootable disk drives into SP memory, where they are compressed into an ICA image. This image can then be transferred from SP memory to the nonvolatile memory module 90a and any bootable data on the data storage system can be erased, allowing configured systems to be restored to pre-configured state, which is useful when the RAID data storage system has been used for demonstration and other purposes. While the preferred implementation uses a flash data module connected to only one SP, other implementations allow multiple SPs, with connected flash data modules, in a data storage system. Any number of methods, such as the SP's configuration in the data storage system as either SP A or SP B, can be used for determining which flash data module connected SP transfers information stored in its flash data module to the disk drive system.

In the preferred implementation, the user is given visual user feedback concerning the status of the information transfer process by light emitting diodes (LEDs). Various blink patterns and fault LEDs indicate transfer status and the type and nature of faults that might occur in the transfer process.

A number of embodiments of the invention have been described. Nevertheless, it is understood that various modifications may be made without departing from the spirit and scope of the invention. Accordingly, other embodiments are within the scope of the following claims.

What is claimed is:

1. A system for installing data storage system software on disk drive systems, comprising;
    a disk drive system connected to a storage processor, wherein the disk drive system comprises a Redundant Array of Inexpensive Disks (RAID) system having a first disk drive and a second disk drive;
    a nonvolatile memory module connected to the storage processor, wherein the nonvolatile memory module uses flash memory, wherein the nonvolatile memory module includes an initializer program and a bootable image; and
    wherein the storage processor is configured to initialize at least one of the first and second disk drives as a bootable device upon installation on the storage processor, the storage processor comprising:
        first logic booting the storage processor from the nonvolatile memory module, wherein booting from the nonvolatile memory module includes executing the initializer program;
        second logic copying the bootable image stored in the nonvolatile memory module to the disk drive system by the initializer program; and
        third logic rebooting the storage processor, wherein rebooting the storage processor includes booting up said copied bootable image directly from the disk drive system.

2. The system of claim 1, wherein the disk drive system comprises a plurality of RAID systems.

3. The system of claim 1, wherein the storage processor reboots after the bootable image is copied to the disk drive system, said reboot using the bootable image copied to the disk drive system from the nonvolatile memory module.

4. The system of claim 3, wherein the disk drive system information instructs the storage processor to erase all data stored on the nonvolatile memory module.

5. The system of claim 1, wherein the bootable image copied from the nonvolatile memory module is in a compressed format, and is decompressed in storage processor memory, wherein the decompressed bootable image is copied to the disk drive system.

6. The system of claim 1 wherein the nonvolatile memory module is integrated onto the storage processor.

7. The system of claim 1 wherein the nonvolatile memory module is connected to the storage processor via an external connector mounted to the storage processor.

8. The system of claim 1 wherein the storage processor copies the bootable image to the disk storage system under the command of information stored in the nonvolatile memory module.

9. The system of claim 1 wherein the bootable image copied to the disk drive system is copied to the nonvolatile memory module.

10. A system for installing data storage system software on disk drive system comprising:
    a disk drive system connected to a plurality of storage processors, wherein the disk drive system comprises a Redundant Array of Inexpensive Disks (RAID) system having a first disk drive and a second disk drive;
    a nonvolatile memory module connected to one of the storage processors in the plurality of storage processors, wherein the nonvolatile memory module uses flash memory, wherein the nonvolatile memory module includes an initializer program and a bootable image; and
    wherein the plurality of storage processors are configured to initialize at least one of the first and second disk drives as a bootable device upon installation on the storage processor, the plurality of storage processors comprising:
        first logic booting the storage processor from the nonvolatile memory module, wherein booting from the nonvolatile memory module includes executing the initializer program;
        second logic copying the bootable image stored in the nonvolatile memory module to the disk drive system by the initializer program; and
        third logic rebooting the storage processor, wherein rebooting the storage processor includes booting up said copied bootable image directly from the disk drive system.

11. The system of claim 10 wherein each storage processor of the plurality of storage processors which does not have the connected nonvolatile memory module waits idle during said copying of bootable image by the storage processor connected to the disk drive system.

12. The system of claim 10 wherein a second nonvolatile memory module is connected to a second of the storage processors in the plurality of storage processors, wherein at least one of the storage processors connected to a nonvolatile memory module is enabled to copy the bootable image stored in the nonvolatile memory module to the disk drive system.

13. A method for installing data storage system software, the method comprising:
    booting a storage processor from a nonvolatile memory module using flash memory, wherein the nonvolatile memory module includes an initializer program and a bootable image;

copying the bootable image stored in the nonvolatile memory module to a disk drive system by the initializer program thereby enabling a system processor to boot directly from the disk drive system upon installation on the storage processor, wherein the disk drive system comprises a Redundant Array of Inexpensive Disks (RAID) system having a first disk drive and a second disk drive, wherein the storage processor boots up said bootable image on at least one of the first and second disk drives; and rebooting the storage processor using the bootable image copied to the disk drive system.

14. The method in claim 13, wherein the storage processor is booted using the bootable image stored in the nonvolatile memory module.

15. The method in claim 13, further comprising:

determining whether the disk drive system contains the bootable image before booting using the nonvolatile memory;

booting the storage processor using the bootable image contained on the disk drive system if the disk drive system contains bootable image.

16. The method in claim 13, further comprising:

erasing the bootable image stored in the nonvolatile memory after the storage processor reboots using the bootable image copied to the disk drive system.

17. The method in claim 13, wherein the bootable image stored in a nonvolatile memory module is in a compressed format and wherein the step of copying bootable image stored in a nonvolatile memory module to a disk drive system enabling the system processor to boot directly from the disk drive system further comprises:

decompressing the bootable image written to storage processor memory; and copying the decompressed bootable image to the disk drive system.

* * * * *